(12) United States Patent
Beaty et al.

(10) Patent No.: US 9,203,709 B2
(45) Date of Patent: *Dec. 1, 2015

(54) SECURE METERING AND ACCOUNTING FOR CLOUD SERVICES

(71) Applicant: International Business Machines Corporation, Armonk, NY (US)

(72) Inventors: Kirk A. Beaty, Goldens Bridge, NY (US); Ashish Kundu, Elmsford, NY (US); Ajay Mohindra, Yorktown Heights, NY (US); Vijay K. Naik, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 320 days.

This patent is subject to a terminal disclaimer.

(21) Appl. No.: 13/736,612

(22) Filed: Jan. 8, 2013

(65) Prior Publication Data

US 2014/0136689 A1    May 15, 2014

Related U.S. Application Data

(63) Continuation of application No. 13/676,583, filed on Nov. 14, 2012.

(51) Int. Cl.
```
H04L 12/26    (2006.01)
H04L 29/08    (2006.01)
H04L 12/24    (2006.01)
```
(52) U.S. Cl.
CPC ............ *H04L 43/04* (2013.01); *H04L 41/5035* (2013.01); *H04L 67/1097* (2013.01)

(58) Field of Classification Search
CPC .. H04L 43/04; H04L 41/5035; H04L 67/1097

USPC .................................................. 709/224, 226
See application file for complete search history.

(56) References Cited

U.S. PATENT DOCUMENTS

| | | | |
|---|---|---|---|
| 8,769,083 B2 | 7/2014 | Ferris et al. | |
| 2004/0167859 A1* | 8/2004 | Mirabella | 705/59 |
| 2004/0260652 A1* | 12/2004 | Rose | 705/51 |
| 2007/0201641 A1 | 8/2007 | Bar et al. | |

(Continued)

FOREIGN PATENT DOCUMENTS

WO    2014078227 A2    5/2014

OTHER PUBLICATIONS

PCT International Search Report dated Jul. 5, 2014 regarding application PCT/US13/69401, 10 pages.

(Continued)

*Primary Examiner* — Brian J Gillis
*Assistant Examiner* — Juan C Turriate Gastulo
(74) *Attorney, Agent, or Firm* — Yee & Associates, P.C.; Louis J. Percello

(57) ABSTRACT

A method, apparatus, and computer program product for managing a service is disclosed. A computer system collects information about the use of a set of resources by the service. Responsive to receiving a request to verify information about the use of the set of resources by the service, the computer system generates a description of the use of the set of resources by the service using the information collected. The computer system then creates a response to the request using the generated description of the use of the set of resources by the service as proof of the validity of the information.

10 Claims, 10 Drawing Sheets

(56) References Cited

U.S. PATENT DOCUMENTS

2008/0275985 A1* 11/2008 Kundu .......................... 709/224
2012/0084665 A1   4/2012 Bookstaff
2012/0311154 A1  12/2012 Morgan
2014/0136707 A1   5/2014 Beaty et al.

OTHER PUBLICATIONS

Office Action dated Oct. 23, 2014, regarding U.S. Appl. No. 13/676,583, 29 pages.
Mell et al., "The NIST Definition of Cloud Computing," National Institute of Standards and Technology, Information Technology Laboratory, Oct. 7, 2009, 2 pages.
Sekar et al., "Verifiable Resource Accounting for Cloud Computing Services," Proceedings of the 3rd ACM Cloud Computing Workshop (CCCW '11), Oct. 2011, 6 pages.
Beaty et al., "Secure Metering and Accounting for Cloud Services," U.S. Appl. No. 13/676,583, filed Nov. 14, 2012, 45 pages.
Final Office Action dated Feb. 3, 2015, regarding U.S. Appl. No. 13/676,583, 23 pages.
Notice of Allowance, dated Jul. 27, 2015, regarding U.S. Appl. No. 13/676,583, 16 pages.
Beaty et al., "Secure Meeting and Accounting for Cloud Services," U.S. Appl. No. 14/836,193, filed Aug. 26, 2015, 49 pages.
Beaty et al., "Secure Meeting and Accounting for Cloud Services," U.S. Appl. No. 14/836,272, filed Aug. 26, 2015, 51 pages.

* cited by examiner

FIG. 10
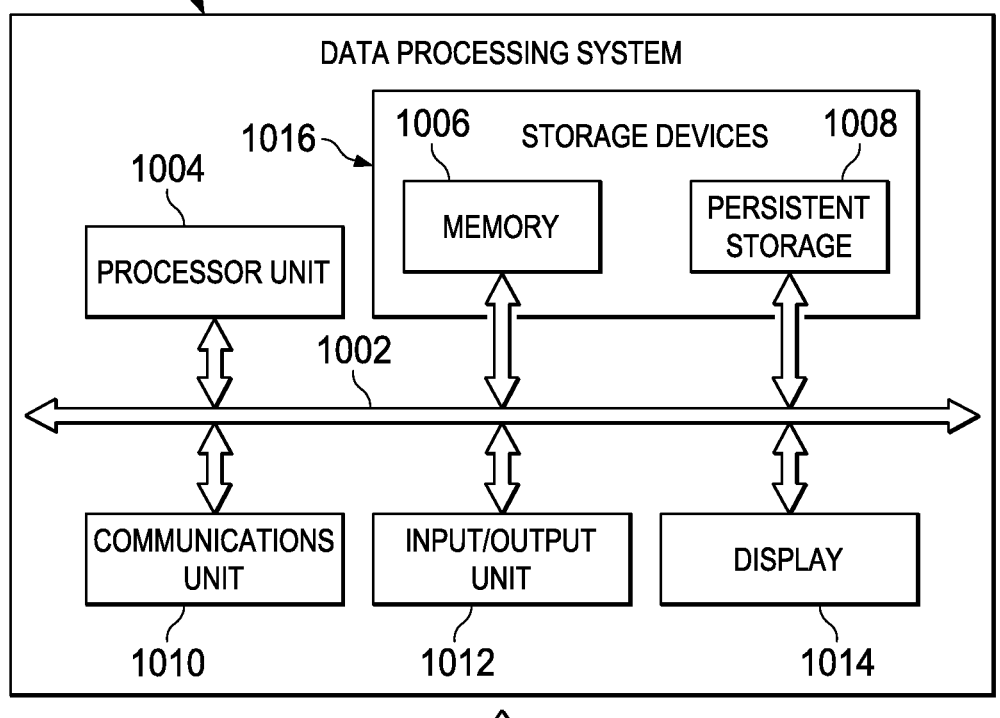
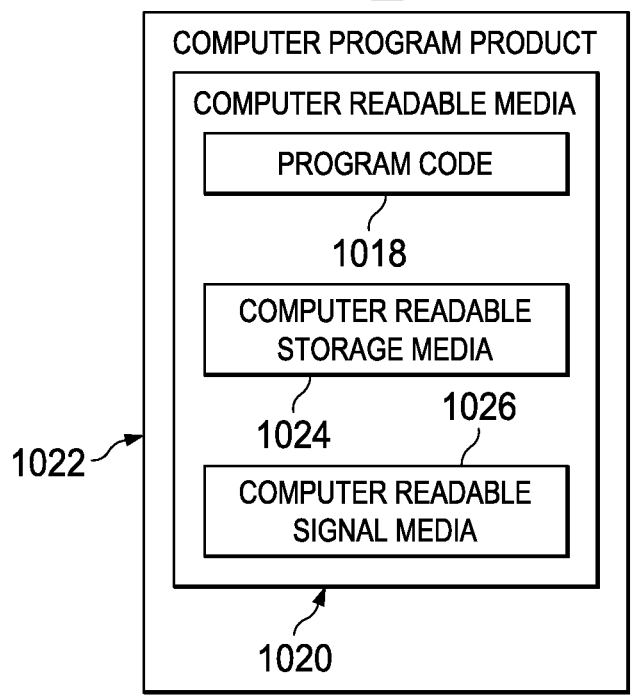

SECURE METERING AND ACCOUNTING FOR CLOUD SERVICES

This application is a continuation of U.S. patent application Ser. No. 13/676,583, filed Nov. 14, 2012, status pending entitled "SECURE METERING AND ACCOUNTING FOR CLOUD SERVICES". The contents of which are hereby incorporated by reference.

BACKGROUND

1. Field

The disclosure relates generally to a data processing environment and, in particular, to verifying information about a use of resources by a service in the data processing environment. Still more particularly, the present disclosure relates to a method and apparatus for using information about the use of resources by the service at the time of use in the data processing environment and then using the signed information as proof of the validity of the information.

2. Description of the Related Art

Cloud computing involves the delivery of computing resources of a data processing environment. Through the use of services hosted in the data processing environment, cloud computing provides users access to the computing resources of the data processing environment. Computing resources of a cloud computing provider may include hardware resources, software, information, and other services. Computing resources of a cloud computing provider may be located in a single location or widely distributed.

The data processing environments of a cloud computing provider are typically located at server computers in a location that is remote to the users. The computing resources in the data processing environments of a cloud computing provider may be provided by the user, by the cloud computing provider, and by third-party providers of computing resources. The users of a particular data processing environment of a cloud computing provider may be consumers and corporate users. In some situations the users of a data processing environment may also be corporate users from two or more corporations who are sharing use of resources.

Due to the remoteness of the data processing environment of the cloud computing provider and also due to the number of concerned parties, users of the cloud computing provider may have concerns related to a reported use of the computing resources by a service. Further, when a user receives a bill associated with use of a service hosted in the data processing environment of a cloud computing provider, the user may question a portion of the bill.

Therefore, it would be advantageous to have a method and apparatus that takes into account at least some of the issues discussed above, as well as possibly other issues.

SUMMARY

In illustrative embodiments, a method, apparatus, and computer program product for managing a service can be provided. In one embodiment a computer system collects information about the use of a set of resources by the service, wherein the use may be for a specific user who would be billed for the use. The information collected may include metering data as an event, such as time of use of a resource by another resource. This metering data may be represented and/or stored as a "usage graph" comprising nodes and directed edges or in some other form. This metering data may also be signed for subsequent use in a process to validate use of the resource. Responsive to receiving a request to verify information about the use of the set of resources by the service, the computer system generates a description of the use of the set of resources by the service using the information collected. The computer system then creates a response to the request using the generated description of the use of the set of resources by the service as proof of the validity of the information.

BRIEF DESCRIPTION OF THE SEVERAL VIEWS OF THE DRAWINGS

FIG. 10 is an illustration of a data processing system in accordance with an illustrative embodiment.

DETAILED DESCRIPTION

Usecases supported by this invention, without limitation, include:
- A client of a cloud service hosted in one or more cloud wants to verify the resource usage reported
- A client wants to verify the resource usage reported for a plurality of specific durations
- A client wants to verify the resource usage reported for a plurality of specific resources for specific durations The key components of this invention, without limitation, include:
- Usage graph: a usage graph is a graph with nodes and directed edges and labels on each node/edge, where each node refers to a service being used, and an edge from one node x to another y refers to the fact that the service referred to by the node x requested/led to the use of service in y.
    - Label on a node refers to the amount of usage per resources at the service referred to by that node
    - Label on an edge from x to y refers to the context of the resource usage at y; context refers to the session information, request ids, timestamps when requests arrived and when responses were sent (if any), client information, credential tokens and so on.
    - A usage graph is similar to that of a workflow of the service, but not equivalent: because services such as auditing are not part of the workflow of the higher-level cloud service.
- After each event or period, the usage graph evolves in the following manner: each node/edge gets a new label, and if services referred to by nodes are non-existent at that moment, then that node does not contain any new labels. Each node/edge starts with label 0 and timestamp. After each event/time duration, a new label is "appended" to the list of labels. In other words, a new instance of the node is added to the usage graph. Similarly, such a process is carried out for edges.

Figure 5:
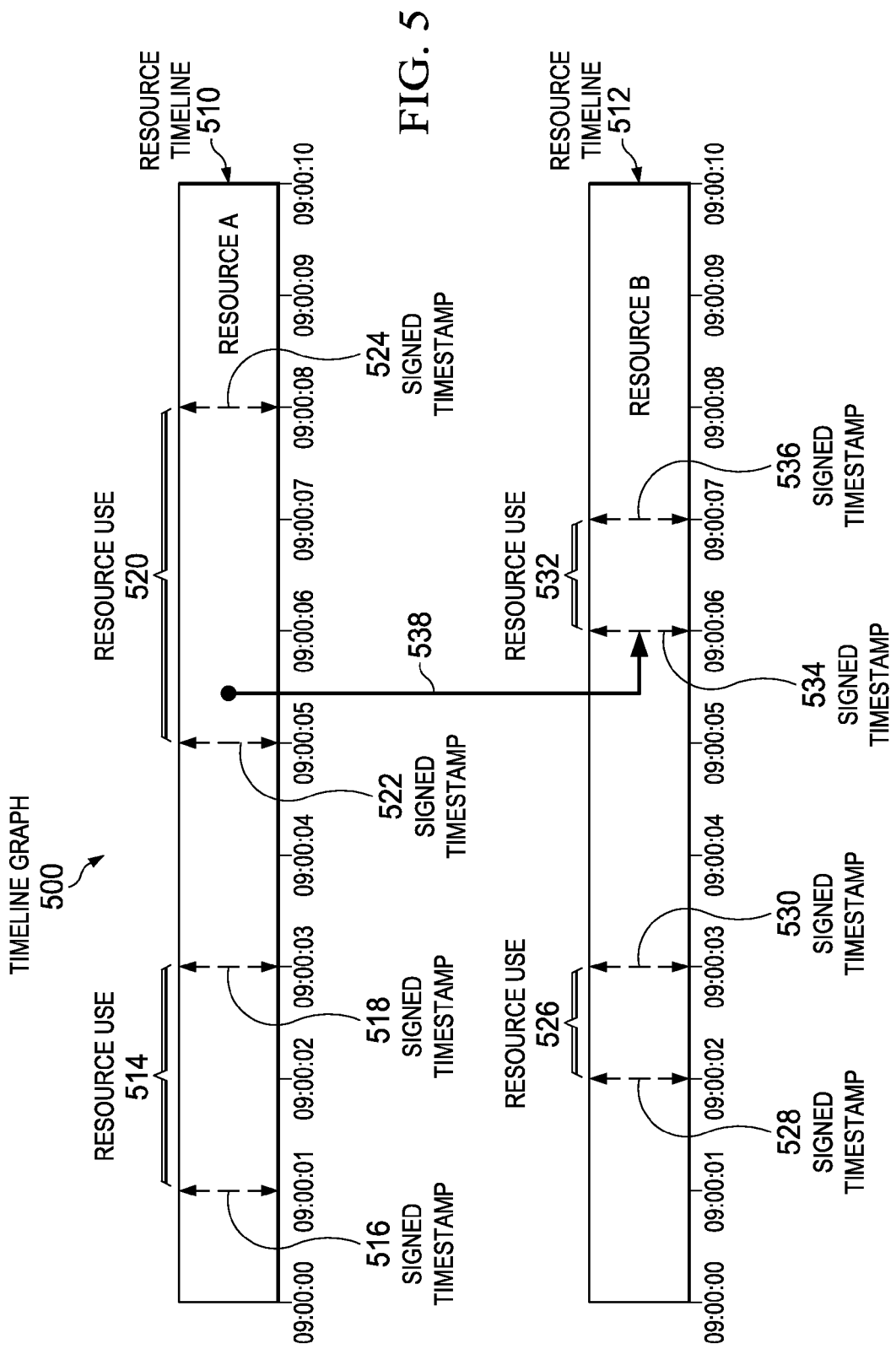
FIG. 5 is an example of a timeline graph of resource use by a service in accordance with an illustrative embodiment.

Evolution of each node in the usage graph along time is shown as timeline graph for that resource/service per user (see FIG. 5).

An implementation of this invention may use another data structure to store this information represented by the usage graph.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including, but not limited to, wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may be run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported which provides transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
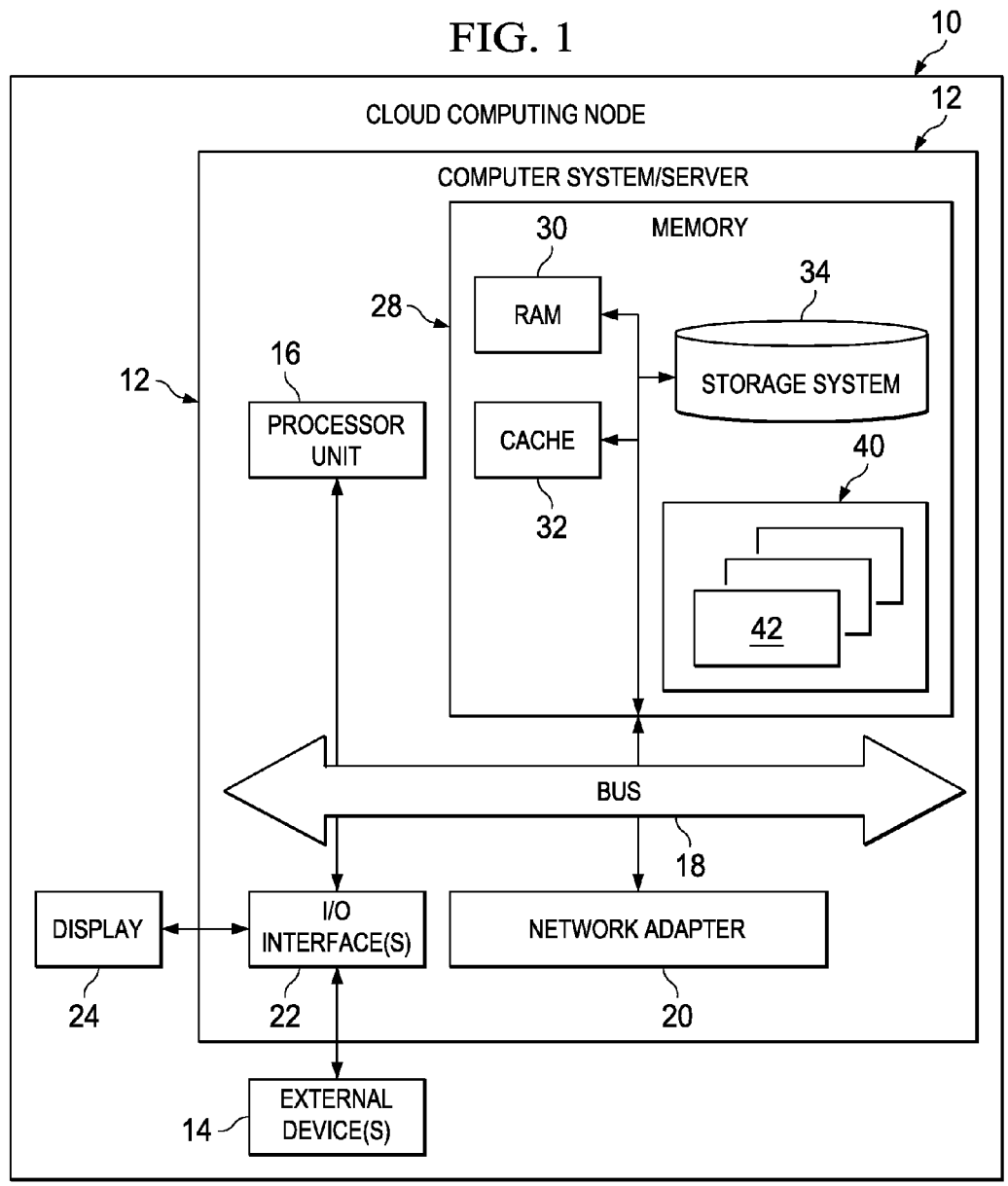
FIG. 1 is an illustration of a cloud computing node in accordance with an illustrative embodiment.

Referring now to FIG. 1, an illustration of a cloud computing node is shown in accordance with an illustrative embodiment. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being run by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, memory 28, and bus 18 that couples various system components including memory 28 to processor unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
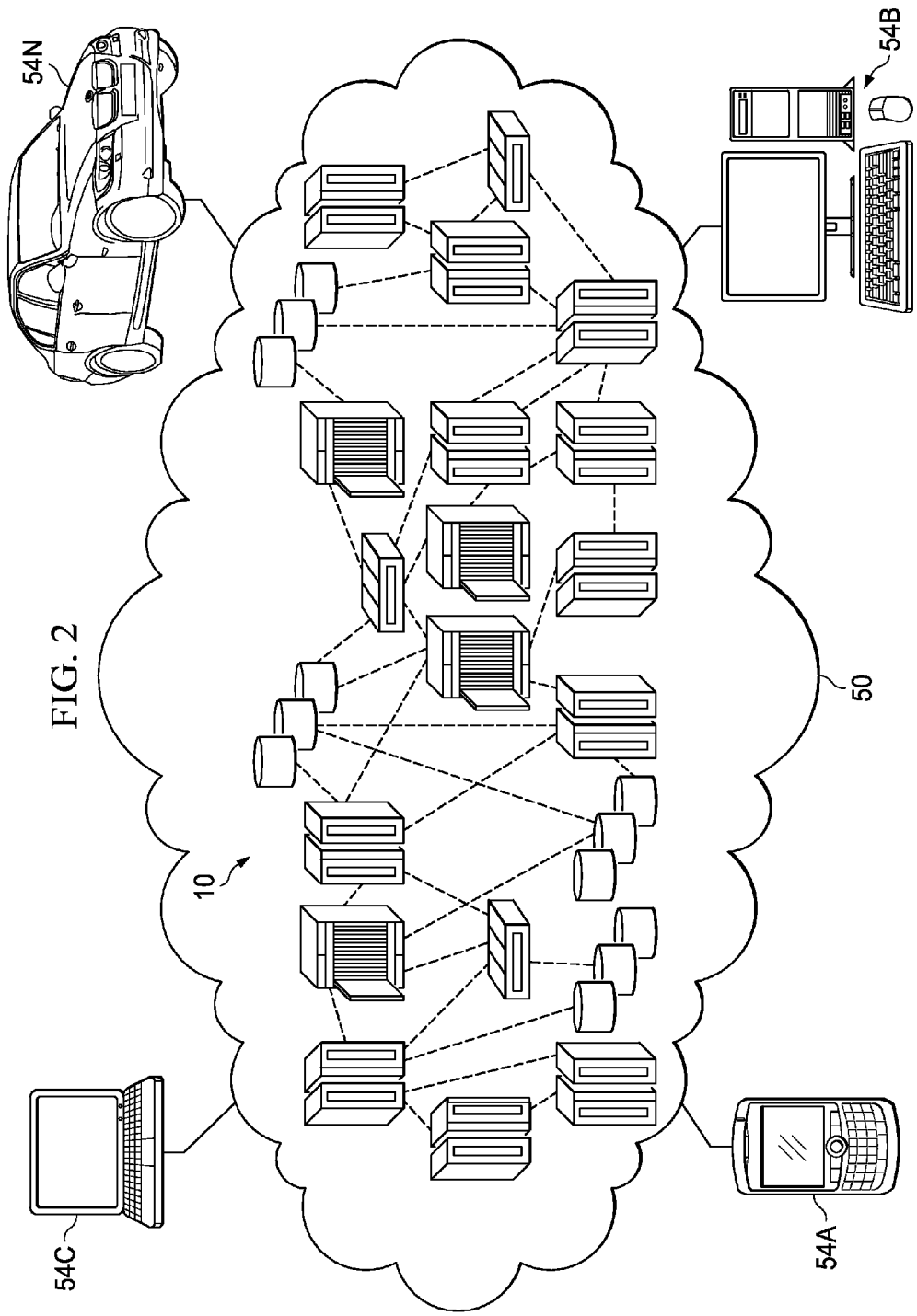
FIG. 2 is an illustration of a cloud computing environment in accordance with an illustrative embodiment.

Referring now to FIG. 2, an illustration of a cloud computing environment 50 is depicted in accordance with an illustrative embodiment. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that cloud computing nodes 10 and cloud computing environment 50 can communicate with any type of computerized device over any type of network and/or network addressable connection (e.g., using a web browser).

Figure 3:
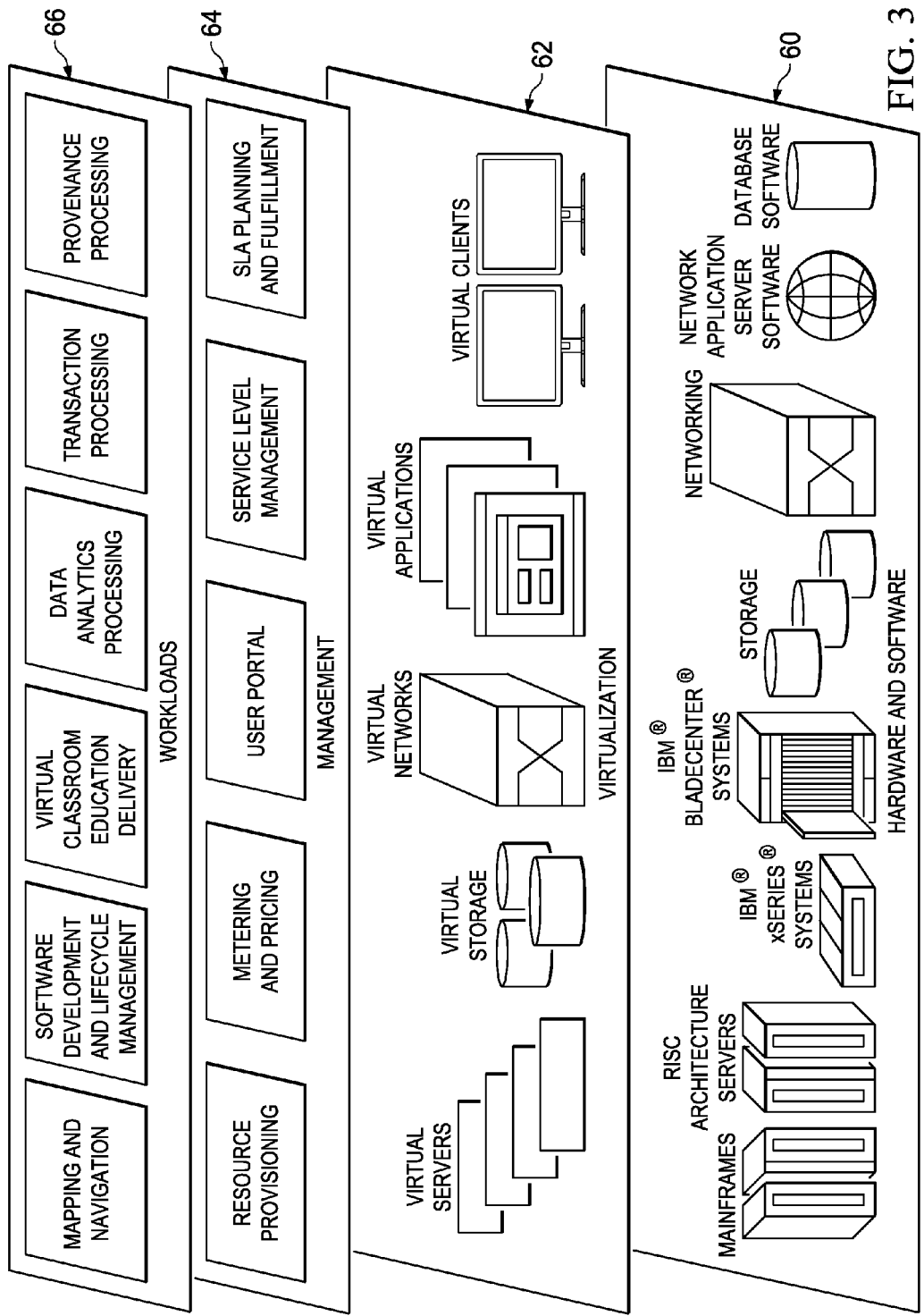
FIG. 3 is an illustration of a set of functional abstraction layers of a cloud computing environment in accordance with an illustrative embodiment.

Referring now to FIG. 3, an illustration of functional abstraction layers provided by cloud computing environment 50 (FIG. 2) is shown in accordance with an illustrative embodiment. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; and networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and provenance processing.

The different illustrative embodiments recognize and take into account a number of different considerations. For example, the different illustrative embodiments recognize and take into account that many different types of resources are used by a service. For example, a service in a network data processing system may have different processes or threads that use some amount of resources. These resources include processor time, memory, storage, network ports, and other services.

The different illustrative embodiments also recognize and take into account that the actual use, by a first service, of resources in a server computer may not be the only use of resources associated with the first service. For example, if the first service uses a second service to process requests from a user, the second service is being used as a resource by the first service. In yet another example, the second service may access a third service which in turn uses other resources to process requests from the first service. As can be seen, other services involved in processing requests from the first service may affect the use of resources by the first service.

The different illustrative embodiments further recognize and take into account existing techniques and particular types of digital signatures used to sign information in data structures. For example, a hash technique may be used to compute a hash value of a tree as a representation of a simple or directed acyclic graph. This hash may then be signed using a public-key signature, such as RSA, DSA, and Elliptic curve-based aggregate signatures.

Thus, one or more illustrative embodiments provide a method, apparatus, and computer program product for managing a service. In one example, a computer system collects information about the use of resources by the service. Responsive to receiving a request to verify information about the use of the resources by the service, the computer system generates a description of the use of the resources by the service using the information collected. The computer system then creates a response to the request using the generated description of the use of the resources by the service as proof of the validity of the information.

One or more illustrative embodiments also provide a method, apparatus, and computer program product for managing the metering of a service. In one example, a computer system identifies a private key corresponding to the service. The computer system collects information about use of resources by the service. The computer system signs the information using the identified private key. Responsive to receiving a request to verify the information, the computer system creates a response to the request using the signed information as proof of the validity of the information.

Metering information as used herein includes both resource usages and service usages. Resource usage includes CPU, memory, network bandwidth, disk storage, swap space, cryptographic and security resources, and/or any resource that is used by a data processing system. Service usage is a use of services as a resource such as a file system service, a monitoring service, a security and intrusion detection service and so on by a service. Each usage may have a specific unit format such as mega bytes of use per unit of time as a unit of network bandwidth used. For example, in a use of services, a service named S3 may use a service named S1 and another named S2. In this example, S1 receives input from a user or from some other medium. S1 processes the input and then invokes service S2. S2 then performs a computation on the input. S2 returns the result of the computation to S1 which in turn returns the result to the user. In this example, service S1 uses a CPU, a storage device, a network, memory, a cache, and file system as still other resources. Other services used by S1 may include, without limitation, access control services for users and other services, intrusion detection services, monitoring services, and archival services.

In these illustrative examples, usage data may be represented as a usage graph. The usage graph may evolve over time based on events. Each node in the graph may represent a particular service or resource. For example, the usage graph may record that at time t0, when a computer in a particular cloud provisioned a service, there was no amount of resource use. In this example, at time t1, service S1 is used and the amount used is measured and stored in the usage graph in node S1 in the usage graph. In this example node S1 may be recorded in the usage graph as sub-node S1(t1). This information in node S1 may contain the information about the user, its authentication information, the request information and request id's, the IP addresses, and any other suitable information about the event. The information stored in node S1 may comprise both metering information and information that identifying the source and cause that triggered the event as well as a consumer of any results generated by processing of the event.

Metering information may be collected and/or metered by providers of cloud computing services. For example, a provider may provide a virtual machine image, a hypervisor, a host operating system, and any other suitable services configured to provide metering information. Metering information may also be collected by trusted second and third parties, such as service that provides metering as a service. The customer of a cloud computing component service may also measure and provide metering information. In these illustrative examples, these services may be configured to collect the metering information at each of a plurality of layers of a computing stack of a particular data processing system, such as a guest operating system, a hypervisor, a host operating system, networks, and other suitable hardware and software components of data processing systems.

In these illustrative examples, signing of metering information may comprise signing a usage graph and other data structures using public key techniques such as Redactable signatures for graphs, RSA, and DSA. Signing of metering information may also comprise using a customer's signing key or some other combination of signing keys from first, second, and third parties associated with the use of resources. For example, a service may collect metering information, compute a hash of a usage graph or other representation of the metering information, and then send the hash to a signing entity, where the hash is time stamped and signed with other information such as a name of the a provider of the service in a cloud computing environment. Still other examples may include using a name and/or key from second and third parties. In these illustrative examples, the usage graph evolves over time based on a recording of each resource use by a service. Each modification to the usage graph may be signed and may use other information located in the usage graph. For example, a sub-graph in a usage graph may contain a new use of a resource that is signed using other information about a previous state of the usage graph. Further in this example, the signing of the information may be performed using an incremental signing technique. Other suitable signing techniques may also be used, such as signing just an update to the usage graph and/or some combination of the updates and existing information in the usage graph. In these illustrative examples, when the cloud provider is not trusted, the collection and signing processes are carried out by customer selected parties that are trusted.

Signatures and keys for use in signing the usage information are stored in a database. The database used may be a signer's database, a trusted party database, a customer's database, and any combination of first, second, and third party databases. Policy may be configured to select databases for use in identifying where sets of signatures are stored. Policies may also be configured to determine how the signatures are created, removed, and updated in the selected databases.

In these illustrative examples, an authorized user or a programmatic entity may request verification of metered data received via electronic or other means, such as a paper copy of a bill mailed to the authorized user. A process for verification may be initiated by the user clicking a button in a graphical user interface, sending an e-mail, making a phone call, and any other suitable means of communication. The verification request may include whether to verify all or a portion of metered data during a time period and/or for certain events. In these illustrative examples, upon receiving a verification request, the process may identify a set of metering information, or a sub-graph of a usage graph of metering information that meets the criteria specified in the request. Subsequent to identifying the metering information the process then verifies the information. The verification may be performed by a service installed in a cloud provider, a trusted third party, a customer computer, and any combination of first, second, and third party data processing systems.

Figure 4:
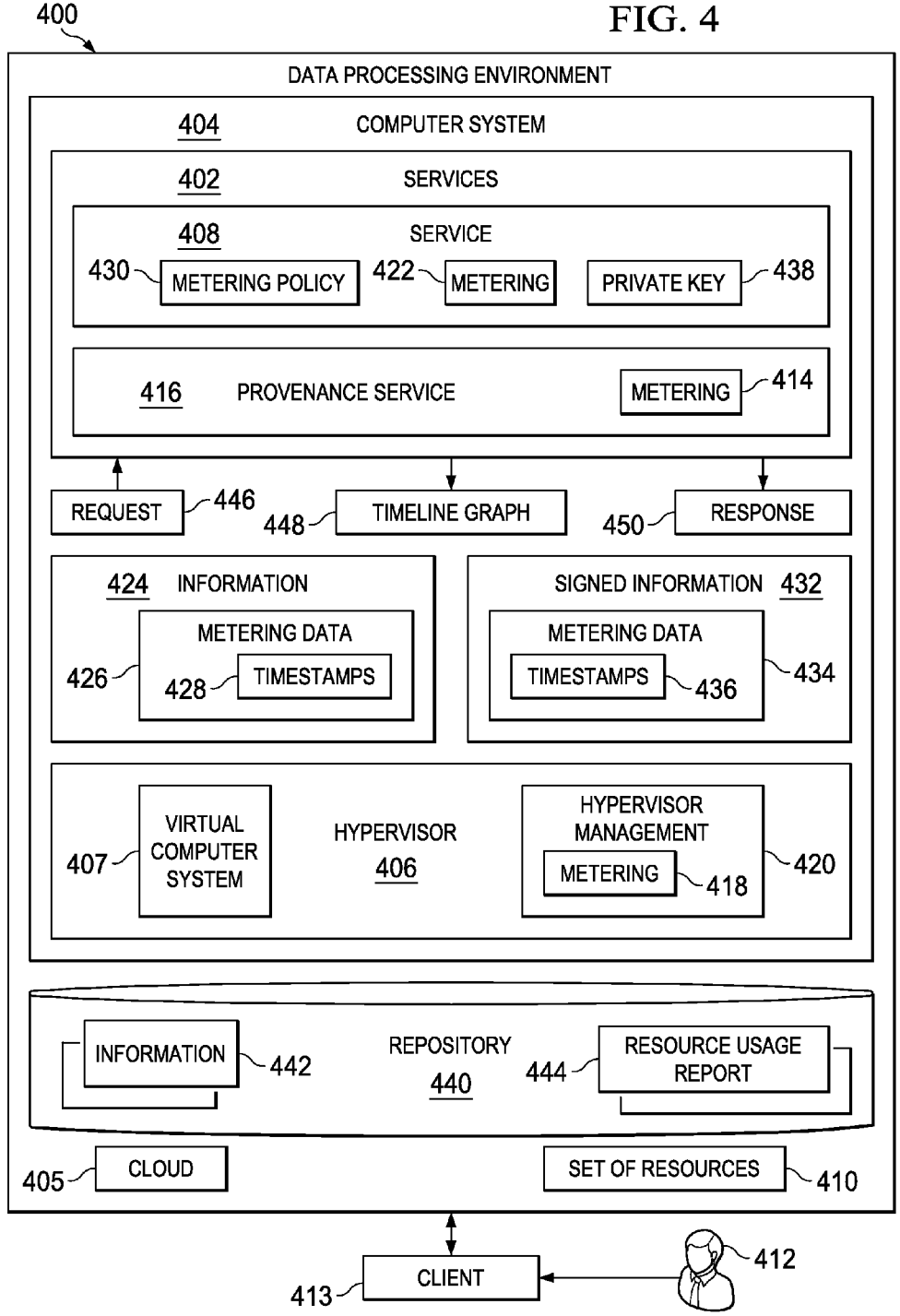
FIG. 4 is an illustration of a data processing environment in accordance with an illustrative embodiment.

Turning now to FIG. 4, an illustration of a data processing environment is depicted in accordance with an illustrative embodiment. Data processing environment 400 is an example of an environment that may be present in different types of computing systems. For example, data processing environment 400 may be included in computer system/server 12 in FIG. 1 on a cloud computing node such as cloud computing nodes 10 in cloud computing environment 50 in FIG. 2. In particular, data processing environment 400 may provide provenance processing in workloads layer 66 in FIG. 3.

As depicted, services 402 in computer system 404 may be managed in data processing environment 400. In these illustrative examples, computer system 404 may take the form of cloud 405. Cloud 405 may include one or more computer systems such as computer system/server 12 on cloud computing nodes 10 in cloud computing environment 50 in FIG. 2. In these illustrative examples, computer system 404 includes hardware and software for running services 402. Computer system 404 may also include hypervisor 406. Hypervisor 406 creates and manages virtual computer systems such as virtual computer system 407. In these illustrative examples, service 408 may run on computer systems such as computer system 404 and virtual computer systems such as virtual computer system 407.

In these illustrative examples, a management program meters use of set of resources 410 by service 408. A set, as used herein with reference to resources, means one or more resources. For example, set of resources 410 is one or more resources. Service 408 may be selected for metering in a number of different ways in these illustrative examples. For example, service 408 may be selected for metering because service 408 uses set of resources 410. In another illustrative example, service 408 may be selected for metering because service 408 is used by another service. In this illustrative example, if service 408 uses another service in services 402 to process a request, the service in use by service 408 is identified as a resource in use by service 408 for the purpose of metering resources used by service 408. In yet another example, the second service may access a third service which in turn accesses other resources such as set of resources 410 to process requests from the first service. As can be seen, other services involved in processing requests from service 408 may affect the use of resources by service 408. In still another illustrative example, service 408 may be selected for metering because service 408 is used by user 412 of client 413. In these illustrative examples, client 413 is an example of personal digital assistant (PDA) or cellular telephone 54A, desktop computer 54B, laptop computer 54C, and/or automobile computer system 54N in FIG. 2.

As depicted, set of resources 410 can be software, hardware, or a combination of the two. In these illustrative examples, set of resources 410 may be services on computer system 404 or on another computer system in data processing environment 400. Service 408 may be affected by other services on computer system 404 or other computer systems in data processing environment 400. For example, other services may also be using set of resources 410. In these illustrative examples, the use of set of resources 410 by other services may occur when processing tasks on other services in data processing environment 400.

As also depicted, metering components such as metering 414 in provenance service 416, metering 418 in hypervisor management 420, metering 422 in service 408, and any other suitable component for generating metering data may be used to generate and collect information 424 about the use of set of resources 410 by service 408. In these illustrative examples, provenance service 416 executes a process for establishing the provenance of information 424 about the use of set of resources 410 by service 408. In these illustrative examples, hypervisor management 420 is an example of a component for managing resource use by a service in virtual computer system 407. In these illustrative examples, collected information 424 about the use of set of resources 410 by service 408 may include metering data 426 such as timestamps 428 and any other suitable information used to identify the use of set of resources 410 by service 408. For example timestamps 428 may include a one or more timestamps that indicate when a resource in set of resources 410 was used by service 408. Timestamps 428 may comprise a start time, a stop time, a duration of time, a performance of the resource at the time of use, and any other time and performance information suitable for measuring when a resource was used, how long the resource was used, how much the resource was used, and a performance of the resource at the time of use.

Provenance as used herein with respect to information about use of resources by a service means assurance of the integrity of the information. For example, provenance of a set of metering data for a use of resources by a service can be established by providing proof that the metering data can be trusted. In these illustrative examples, one means for proving that the metering data can be trusted is to include a process for digitally signing information in the metering data. For example, digitally signing timestamps in a set of metering data for a use of resources by a service can then later be identified as proof that the metering data can be trusted.

Suitable information for identifying the use of set of resources 410 by service 408 may include data identifying the use of set of resources 410 and purpose of the use in these illustrative examples. For example, data identifying the use of set of resources 410 by service 408 may include a session identifier, a process identifier, a thread identifier, a transaction identifier, a human readable name of the resource used, and any other identifier that identifies a particular use. Data identifying the purpose of the use of set of resources 410 by service 408 may include the type of use of the resource, and may also optionally include a digital copy of one or more portions of the resources used by the service 408. For example, a particular resource used in set of resources 410 by service 408 may include a database and the use of the database by service 408 may be for retrieving account information stored in the database. In this example, information 424 may also include a log of the retrieval of the account information for the particular account number of the account information that was retrieved from the database by service 408.

In these illustrative examples, metering policy 430 in service 408 identifies information 424 that must be collected about the use of set of resources 410 by service 408 and also for filtering collected information 424 about the use of set of resources 410 by service 408. For example, metering policy 430 may comprise instructions to store information 424 about the use of set of resources 410 by service 408 for a particular period of time. Another example of metering policy 430 may comprise instructions to filter out particular information from information 424, such as private customer data. Still another example of metering policy 430 may comprise instructions for metering components, such as metering 414 in provenance service 416, metering 418 in hypervisor management 420, and metering 422 in service 408, to sign information 424 to form signed information 432. In this example, the instructions in metering policy 430 to sign information 424 may include instructions to sign metering data 426 to form signed metering data 434 such as signed timestamps 436. Further in this example, the instructions to sign information 424 may also include instructions to use a particular private key such as private key 438 to secure information 424 in the form of signed information 432 about the use of set of resources 410 by service 408. The process for securing information 424 in the form of signed information 432 using private key 438 may include encrypting information 424 for un-encryption by a public key associated with private key 438 that is not shown.

As depicted, repository 440 is used by computer system 404 as storage for information 442 and resource usage report 444. In these illustrative examples, repository 440 may be one or more storage devices in hardware and software layer 60 in FIG. 3. In these illustrative examples, stored information 442 may include information 424 such as timestamps 428 in metering data 426, signed information 432 such as timestamps 436 in metering data 434, and any other information suitable for recording information about the use of set of resources 410 by service 408. The contents of information 442 may be defined by metering policy 430. For example, metering policy 430 may include instructions to store information 424 and signed information 432 in a particular repository such as repository 440. As another example, metering policy 430 may include instructions to filter information 424 and signed information 432 to store identified portions of information 424 and signed information 432 in repository 440.

In these illustrative examples, resource usage report 444 may include a report that provides details about the use of set of resources 410 by service 408. Resource usage report 444 may also include one more summaries of the use of set of resources 410 by service 408. The summaries may describe the use of set of resources 410 by service 408 over a particular time period such as hourly, daily, weekly, monthly, and time periods of a particular event of interest. Events of interest in these examples may include times of high use of set of resources 410 by service 408, times of low use, times when an issue occurred, and times specified by metering policy 430. For example, metering policy 430 may include instructions to generate a summary in resource usage report 444 describing the use of set of resources 410 by service 408 when a computer failure occurs such as one that requires backup computing resources in set of resources to be used. Another example, without limitation, may include metering policy 430 having instructions to generate a summary in resource usage report 444 describing the use of set of resources 410 by service 408 in response to computer system 404 having to use additional computing resources in set resources to meet a threshold of performance for executing service 408 in computer system 404. In still other examples resource usage report 444 may also be used in the form of an invoice or bill that is sent to user 412.

As depicted, user 412 may use client 413 to make request 446 to verify information about the use of set of resources 410 by service 408. Responsive to receiving request 446, computer system 404 generates timeline graph 448 using signed information 432 such as timestamps 436 in metering data 434. In these illustrative examples, timeline graph 448 is a human readable graph depicting a timeline of the use of set of resources 410 by service 408. Responsive to receiving request 446 and the generation of timeline graph 448, computer system 404 then generates response 450 at least comprising timeline graph 448 and response 450 to client 413. Subsequent to receiving response 450 client 413 may then display timeline graph 448 to user 412 as proof as proof of the validity of the information about the use of set of resources 410 by service 408.

In these illustrative examples request 446 to verify information about the use of set of resources 410 by service 408 may be in the form of a request to verify one or more selected portions of a bill and one or more selected portions of resource usage report 444. In these illustrative examples, responsive to receiving request 446 to verify the one or more selected portions, computer system 404 determines from request 446 a selected period of time for the use of set of resources 410 by service 408 to verify based on the selected portions. Further in this example, the selected period of time to verify may be used as a filter by computer system 404 to isolate only the uses of set of resources 410 by service 408 that are associated with the portion selected when generating timeline graph 448.

As depicted the instructions in metering policy 430, the components for metering, such as metering 422, and private key 438 may be provided by a user of service 408, such as user 412. In providing metering policy 430, metering 422, and private key 438, user 412 configures when, what, and how information is recorded for metering the use of set of resources 410 by service 408.

The illustration of resource configuration environment 400 in FIG. 4 is not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these functional components may be combined, divided, or combined and divided into different blocks when implementing an illustrative embodiment.

For example, although computer system 404 has been described with respect to cloud 405, other illustrative embodiments may be applied to other types of network data processing systems in addition to and/or in place of cloud 405. As one illustrative example, computer system 404 may be a local area network (LAN), a wide area network (WAN), an intranet, the Internet, or some combination thereof. As another illustrative example, although set of resources 410 has been described as software, hardware, or a combination of the two on computer system 404 or on another computer system in data processing environment 400, other resources may also be used. For example, a remote information service may be used by service 408 to retrieve information for use by service 408. In this example, remote information service may include stock information, banking information, and any other information suitable for use by service 408.

With reference now to FIG. 5, an illustration of an example of a timeline graph of resource use by a service is depicted in accordance with an illustrative embodiment. Timeline graph 500 is an illustrative example of timeline graph 448 generated by computer system 404 in FIG. 4 using signed information 432 such as timestamps 436 in metering data 434 in FIG. 4.

In this illustrative example, timeline graph 500 is comprised of resource timeline 510 of resource A and resource timeline 512 of resource B. Resource timeline 510 of resource A is a depiction of an example of uses of a particular resource in set of resources 410 by service 408 in FIG. 4. Resource timeline 512 of resource B is a depiction of an example of uses of another particular resource in set of resources 410 by service 408.

As depicted in this illustrative example, resource timeline 510 of resource A depicts resource use 514 occurring between 09:00:01 and 09:00:03 as indicated by signed timestamp 516 and signed timestamp 518. Resource timeline 510 of resource A, also depicts resource use 520 occurring between 09:00:05 and 09:00:08 as indicated by signed timestamp 522 and signed timestamp 524. As also depicted in this illustrative example, resource timeline 512 of resource B depicts resource use 526 occurring between 09:00:02 and 09:00:03 as indicated by signed timestamp 528 and signed timestamp 530. Resource timeline 512 of resource B further depicts resource use 532 occurring between 09:00:06 and 09:00:07 as indicated by signed timestamp 534 and signed timestamp 536. As still further depicted, link 538 shows an event occurred between 09:00:05 and 09:00:06 in which resource use 520 of resource A in resource timeline 510 caused resource use 532 of resource B in resource timeline 512.

The illustrative example of timeline graph 500 is not meant to imply physical or architectural limitations to the manner in which an illustrative embodiment may be implemented. Other information in addition to and/or in place of the information illustrated may be used. Other links may also be shown such as links tying the use of resources back to the calling service when the use of the resource includes a response that is sent to the calling service. Some information may be unnecessary. For example, resource use 526 may be omitted from timeline graph 500 if resource use 526 was not in response to a use by service 408 in FIG. 4. In still other examples, the depiction of resource use of set of resources 410 by service 408 in timeline graph 500 may include all or a portion of information 424 in FIG. 4 about the use of set of resources 410 by service 408 in FIG. 4 as per instructions in metering policy 430 in FIG. 4. For example, instructions in metering policy 430 may include instructions to include signed timestamps when generating timeline graph 500 and to filter out any use of a resource that is not explicitly attributed to a use of the resource by service 408.

Figure 6:
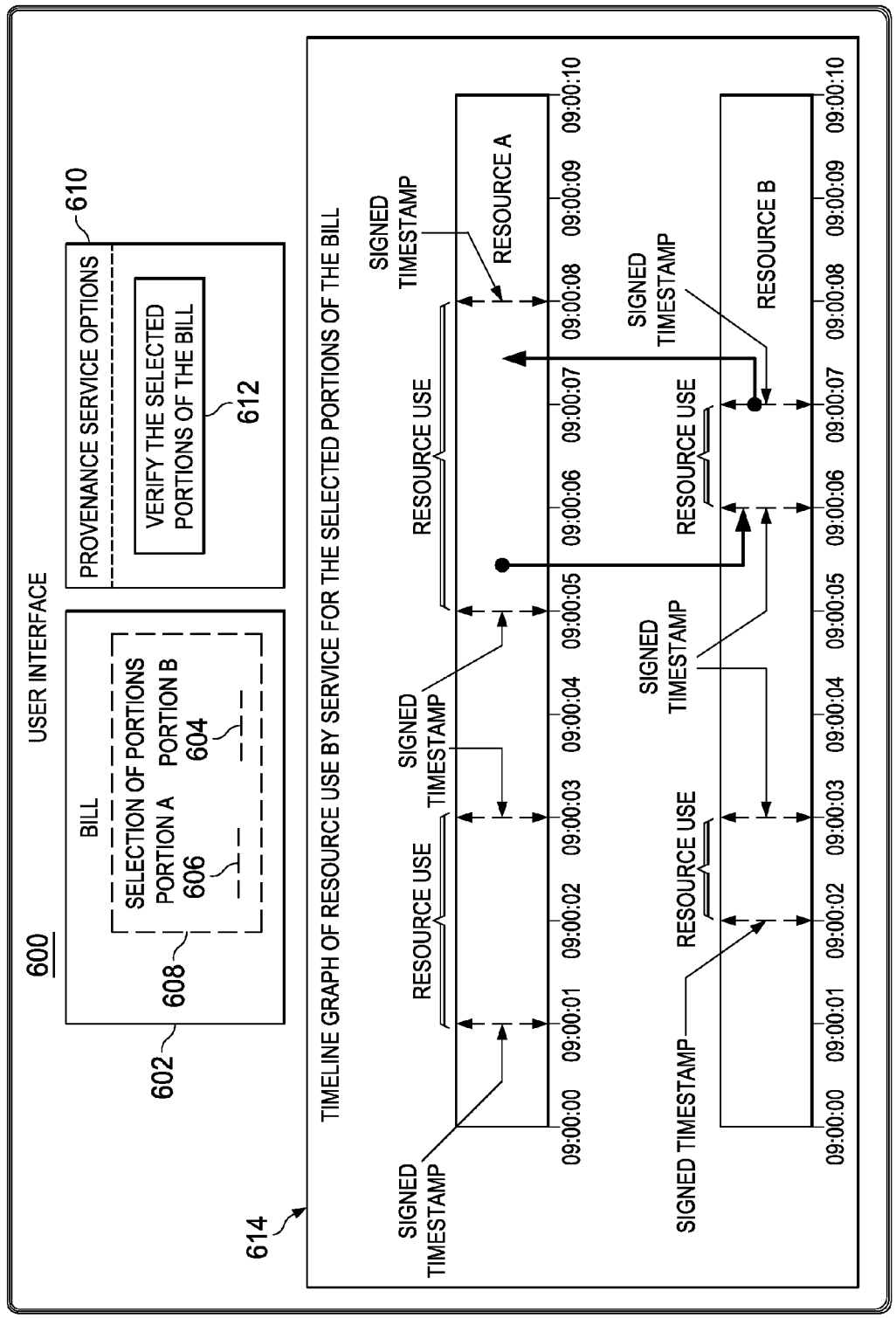
FIG. 6 is an example of a graphical user interface for entering requests to establish provenance of selected portions of a bill in accordance with an illustrative embodiment.

Turning next to FIG. 6, an example of a graphical user interface for entering requests to establish provenance of selected portions of a bill is depicted in accordance with an illustrative embodiment. User interface 600 is an illustrative example of a computer display such as display 24 in FIG. 1 of a client such as client 413 in FIG. 4.

As depicted, bill 602 comprises portion A 604 and portion B 606. As shown, selection of portions 608 comprises a graphical display of a selection portion of bill 602. For example a user such as user 412 in FIG. 4 may use a mouse or other user input devices to select portion A 604 and portion B 606 in bill 602 to form selection of portions 608. As also depicted, provenance service options 610 for bill 602 include the option to verify the selected portions of the bill 612. In these illustrative examples, when a user has made a selection for portions of a bill such as selection of portions 608 of bill 602, the user may then select the option to verify selected portions 608 using the option "verify the selected portions of the bill 612."

In this illustrative example, responsive to selection of portions 608 and selection of the option "verify the selected portions of the bill 612" client 413 generates a request such as request 446 in FIG. 4 to verify the selected portions of bill 602. Subsequent to computer system 404 processing request 446 by generating and sending timeline graph 448 to client 413 in response 450 in FIG. 4. Client 413 subsequently receives response 450.

As also depicted subsequent to receiving timeline graph 448 in response 450 client 413 generates display of timeline graph of resource use by service for the selected portions of the bill 614 in user interface 600 using the information in timeline graph 448.

Figure 7:
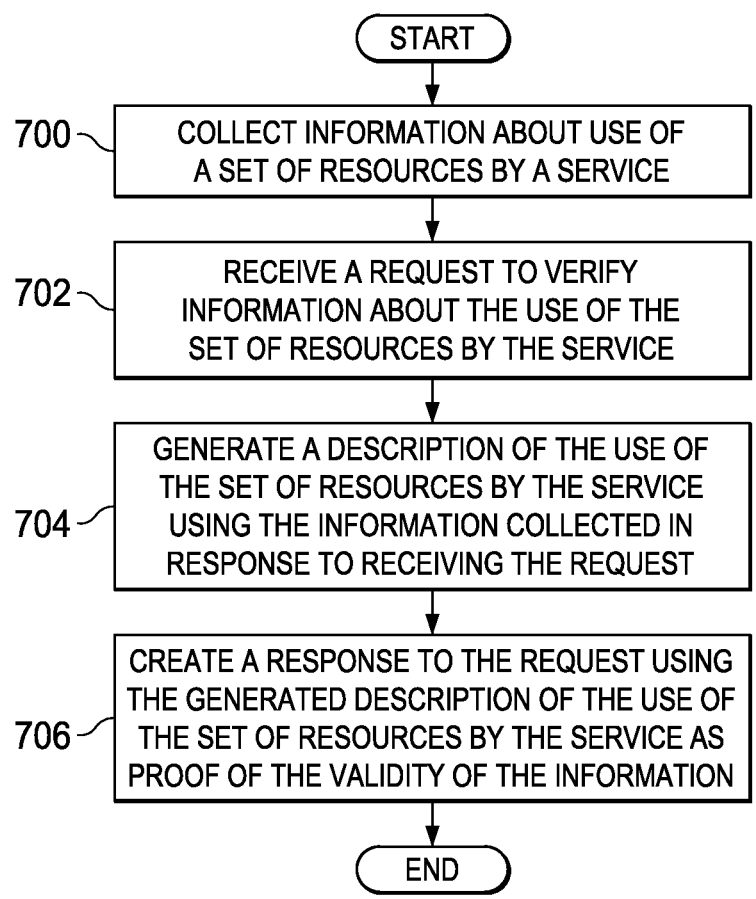
FIG. 7 is a flowchart of a process for managing a service in accordance with an illustrative embodiment.

With reference now to FIG. 7, an illustrative example of a flowchart of a process for managing a service is depicted in accordance with an illustrative embodiment. The steps in FIG. 7 may be implemented in software, hardware, or a combination of the two in computer system 404 in data processing environment 400 in FIG. 4. In particular, the steps may be implemented by metering components, such as metering 414 in provenance service 416, metering 418 in hypervisor management 420, and metering 422 in service 408; by services, such as provenance service 416; and by management components such as hypervisor management 420.

The process begins by collecting information 424 in FIG. 4 about use of set of resources 410 in FIG. 4 by service 408 in FIG. 4 (Step 700). The process then receives request 446 to verify information about the use of set of resources 410 by service 408 (Step 702). In response to receiving the request, the process generates a description of the use of set of resources 410 by service 408 using collected information 424 (Step 704). The process then creates response 450 in FIG. 4 to request 446 using the generated description of the use of set of resources 410 by service 408 as proof of the validity of the information (Step 706), with the process terminating thereafter.

Figure 8:
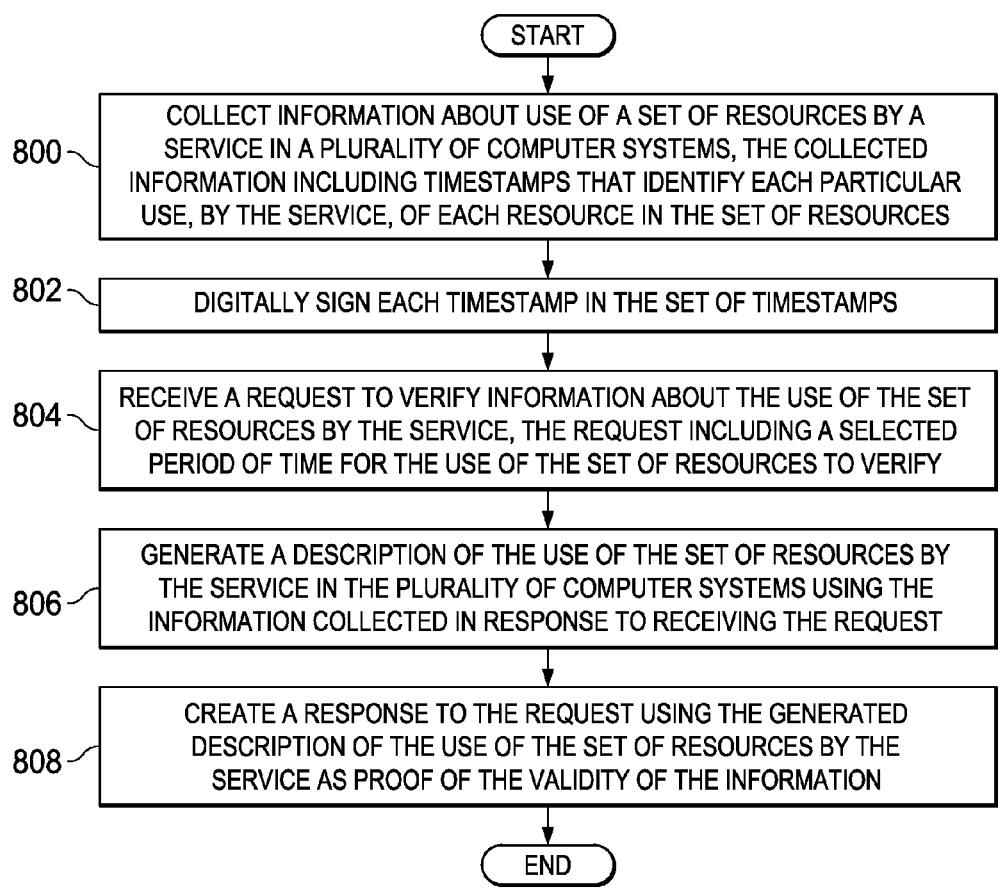
FIG. 8 is a flowchart of a process for managing a service in accordance with an illustrative embodiment.

Turning next to FIG. 8, an illustrative example of a flowchart of a process for managing a service is depicted in accordance with an illustrative embodiment. The steps in FIG. 8 may be implemented in software, hardware, or a combination of the two in computer system 404 in data processing environment 400 in FIG. 4. In particular, the steps may be implemented by metering components, such as metering 414 in provenance service 416, metering 418 in hypervisor management 420, and metering 422 in service 408; by services, such as provenance service 416; and by management components such as hypervisor management 420.

The process begins by collecting information 424 in FIG. 4 about use of set of resources 410 in FIG. 4 by service 408 in FIG. 4 in a plurality of computer systems such as computer system 404 (Step 800). In this example, collected information 424 includes time stamps that identify each particular use, by the service, of each resource in the set of resources.

The process then digitally signs each timestamp in the set of timestamps to form signed timestamps (Step 802). The process receives a request to verify information about the use of set of resources 410 by service 408 in the plurality of computer systems using collected information 424, the request including a selected period of time for the use of the set of resources to verify (Step 804).

In response to receiving the request, the process generates a description of the use of set of resources 410 by service 408 using collected information 424 about use of set of resources 410 by service 408 in the plurality of computer systems (Step 806). The process then creates response 450 in FIG. 4 to request 446 using the generated description of the use of set of resources 410 by service 408 as proof of the validity of the information (Step 808), with the process terminating thereafter.

Figure 9:
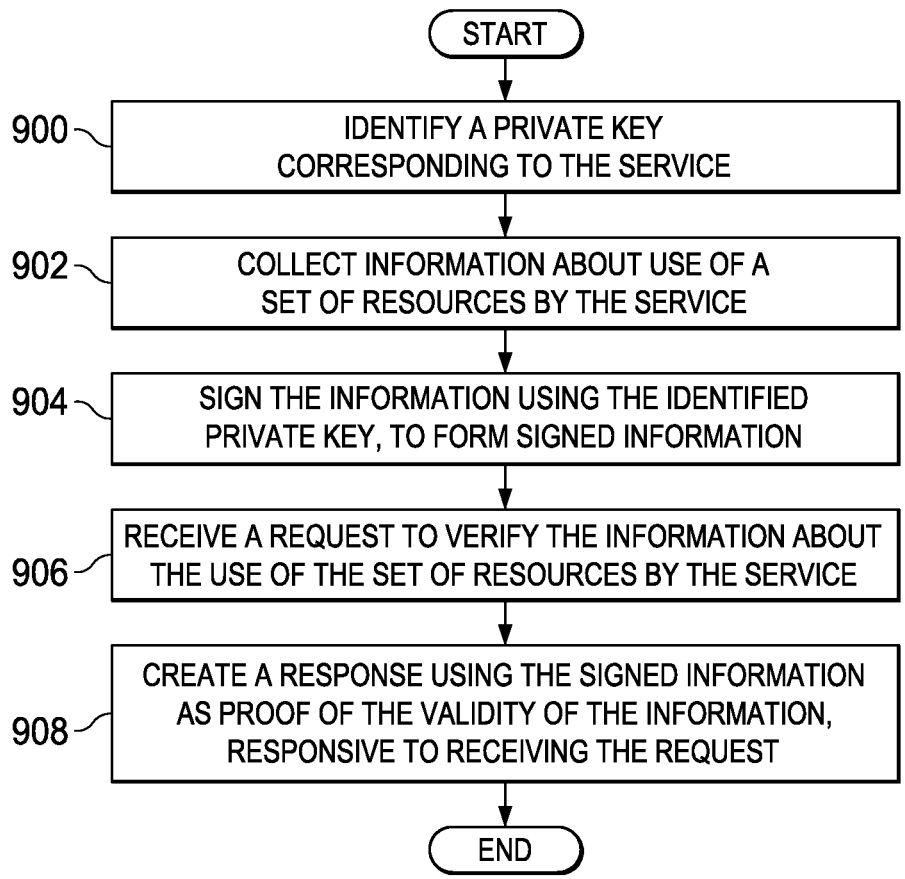
FIG. 9 is a flowchart of a process for managing the metering of a service in accordance with an illustrative embodiment.

With reference now to FIG. 9, an illustrative example of a flowchart of a process for managing the metering of a service is depicted in accordance with an illustrative embodiment.

The steps in FIG. 9 may be implemented in software, hardware, or a combination of the two in computer system 404 in data processing environment 400 in FIG. 4. In particular, the steps may be implemented by metering components, such as metering 414 in provenance service 416, metering 418 in hypervisor management 420, and metering 422 in service 408; by services, such as provenance service 416; and by management components such as hypervisor management 420.

The process begins by identifying private key 438 in FIG. 4 corresponding to service 408 in FIG. 4 (Step 900). The process collects information 424 in FIG. 4 about use of set of resources 410 by service 408 (Step 902). The process also signs information 424 using identified private key 438 to form signed information 432 in FIG. 4 (Step 904).

The process then receives request 446 to verify the information about the use of set of resources 410 by service 408 (Step 906). In response to receiving the request, the process creates response 450 in FIG. 4 to request 446 using signed information 432 about the use of set of resources 410 by service 408 as proof of the validity of the information (Step 908), with the process terminating thereafter.

Turning now to FIG. 10, an illustration of a data processing system is depicted in accordance with an illustrative embodiment. In this illustrative example, data processing system 1000 includes communications fabric 1002, which provides communications between processor unit 1004, memory 1006, persistent storage 1008, communications unit 1010, input/output (I/O) unit 1012, and display 1014. Data processing system 1000 is an example of a data processing system that may be used to implement managing a service in a network data processing system. Data processing system 1000 is also an example of a data processing system that may be used to implement computer system/server 12 and cloud computing nodes such as cloud computing node 10 in FIG. 1. Data processing system 1000 also may be used to implement personal digital assistant (PDA) or cellular telephone 54A, desktop computer 54B, laptop computer 54C, automobile computer system 54N, and other local computing devices used by cloud consumers in FIG. 2. Data processing system 1000 may also be used to implement the hardware and software components of hardware and software layer 60 in FIG. 3. More particularly, data processing system 1000 may be used to implement computer system 404 in FIG. 4.

Processor unit 1004 serves to process instructions for software that may be loaded into memory 1006. Processor unit 1004 may be a number of processors, a multi-processor core, or some other type of processor, depending on the particular implementation. "A number," as used herein with reference to an item, means one or more items. Further, processor unit 1004 may be implemented using a number of heterogeneous processor systems in which a main processor is present with secondary processors on a single chip. As another illustrative example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Storage devices 1016 may also be referred to as computer readable storage devices in these examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output unit 1012 allows for input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications fabric 1002. In these illustrative examples, the instructions are in a functional form on persistent storage 1008. These instructions may be loaded into memory 1006 for processing by processor unit 1004. The processes of the different embodiments may be performed by processor unit 1004 using computer-implemented instructions, which may be located in a memory, such as memory 1006.

These instructions are referred to as program code, computer usable program code, or computer readable program code that may be read and processed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for processing by processor unit 1004. Program code 1018 and computer readable media 1020 form computer program product 1022 in these examples.

In one example, computer readable media 1020 may be computer readable storage media 1024 or computer readable signal media 1026.

Computer readable storage media 1024 may include, for example, an optical or magnetic disk that is inserted or placed into a drive or other device that is part of persistent storage 1008 for transfer onto a storage device, such as a hard drive, that is part of persistent storage 1008. Computer readable storage media 1024 also may take the form of a persistent storage, such as a hard drive, a thumb drive, or a flash memory, that is connected to data processing system 1000.

In some instances, computer readable storage media 1024 may not be removable from data processing system 1000. In these examples, computer readable storage media 1024 is a physical or tangible storage device used to store program code 1018 rather than a medium that propagates or transmits program code 1018. Computer readable storage media 1024 is also referred to as a computer readable tangible storage device or a computer readable physical storage device. In other words, computer readable storage media 1024 is media that can be touched by a person.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1018 may be downloaded over a network to persistent storage 1008 from another device or data processing system through computer readable signal media 1026 for use within data processing system 1000. For instance, program code stored in a computer readable storage medium in a server data processing system may be downloaded over a network from the server to data processing system 1000. The data processing system providing program code 1018 may be a server computer, a client computer, a remote data processing system, or some other device capable of storing and transmitting program code 1018. For example, program code stored in the computer readable storage medium in data processing system 1000 may be downloaded over a network from the remote data processing system to the computer readable storage medium in data processing system 1000. Additionally, program code stored in the computer readable storage medium in the server computer may be downloaded over the network from the server computer to a computer readable storage medium in the remote data processing system.

The different components illustrated for data processing system 1000 are not meant to provide architectural limitations to the manner in which different embodiments may be implemented. The different illustrative embodiments may be implemented in a data processing system including components in addition to and/or in place of those illustrated for data processing system 1000. Other components shown in FIG. 10 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic device, a field programmable logic array, a field programmable gate array, and other suitable hardware devices. With this type of implementation, program code 1018 may be omitted, because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system.

Additionally, communications unit 1010 may include a number of devices that transmit data, receive data, or transmit and receive data. Communications unit 1010 may be, for example, a modem or a network adapter, two network adapters, or some combination thereof. Further, a memory may be, for example, memory 1006, or a cache, such as found in an interface and memory controller hub that may be present in communications fabric 1002.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

Thus, the illustrative embodiments provide a method, apparatus, and computer program product for establishing provenance of the use of resources by a service in a cloud computing environment using secure metering information. In one example, a computer system collects secure metering information about the use of a set of resources by the service in the cloud computing environment. Responsive to receiving a request to verify information about the use of the set of resources by the service, the computer system generates a description of the use of the set of resources by the service using the secure metering information collected. The computer system then creates a response to the request using the generated description of the use of the set of resources by the service as proof of the validity of the information.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application, or technical improvement over technologies found in the marketplace, or to enable others of ordinary skill in the art to understand the embodiments disclosed herein.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

What is claimed is:

1. A computer for managing a service, the computer comprising:
    a bus;
    a processor unit connected to the bus; and
    a computer readable storage device connected to the bus, wherein the computer readable storage device stores program instructions that are executable by the processor unit to:
    collect information about use of a set of resources by the service, wherein the computer stores the collected information about the set of resources used by the service in a usage graph, and wherein the computer digitally signs the usage graph storing the collected information about the set of resources used by the service;
    receive a request to verify information regarding a selected portion of a period of time during the use of the set of resources by the service;
    generate a description of the use of the set of resources by the service during the selected portion of the period of time using the collected information in response to receiving the request to verify the information regarding the selected portion of the period of time during the use of the set of resources by the service, wherein the computer generates and verifies the description of the use of the set of resources by the service using the collected information in the digitally signed usage graph; and
    create a response to the request using the generated description of the use of the set of resources by the service during the selected portion of the period of time as proof of validity of the information.

2. The computer of claim 1, wherein the collected information about the use of the set of resources by the service includes a set of digitally signed time stamps identifying each particular use of each resource in the set of resources by the service, and wherein the computer digitally signs each time stamp in the set of time stamps identifying each particular use of each resource in the set of resource by the service, and wherein collecting the information about the use of the set of resources by the service further comprises the processor unit executing the program instructions to:
    digitally sign the information about each particular use.

3. A computer program product for managing a service, the computer program product comprising a computer readable storage device having program instructions embodied therewith, the program instructions executable by a computer to cause the computer to:
    collect information about use of a set of resources by the service, wherein the computer stores the collected information about the set of resources used by the service in a usage graph, and wherein the computer digitally signs the usage graph storing the collected information about the set of resources used by the service;
    receive a request to verify information regarding a selected portion of a period of time during the use of the set of resources by the service;
    generate a description of the use of the set of resources by the service during the selected portion of the period of time using the collected information in response to receiving the request to verify the information regarding the selected portion of the period of time during the use of the set of resources by the service, wherein the computer generates and verifies the description of the use of the set of resources by the service using the collected information in the digitally signed usage graph; and
    create a response to the request using the generated description of the use of the set of resources by the service during the selected portion of the period of time as proof of validity of the information.

4. The computer program product of claim 3, wherein the collected information about the use of the set of resources by the service includes a set of digitally signed time stamps identifying each particular use of each resource in the set of resources by the service, and wherein collecting the information about the use of the set of resources by the service further comprises the computer executing the program instructions to:
    digitally sign the information about each particular use.

5. A computer for managing metering of a service, the computer comprising:
    a bus;
    a processor unit connected to the bus; and
    a computer readable storage device connected to the bus, wherein the computer readable storage device stores program instructions that are executable by the processor unit to:
    identify a private key corresponding to the service;
    collect information about use of a set of resources by the service, wherein the computer stores the collected information about the set of resources used by the service in a usage graph, and wherein the computer digitally signs the usage graph storing the collected information about the set of resources used by the service, and wherein the computer generates and verifies a description of the use of the set of resources by the service using the collected information in the digitally signed usage graph;
    sign the collected information using the identified private key, to form signed information;
    receive a request to verify information regarding a selected portion of a period of time during the use of the set of resources by the service; and
    create a response to the request using the signed information as proof of validity of the information in response to receiving the request to verify the information regarding the selected portion of the period of time during the use of the set of resources by the service.

6. The computer of claim 5, wherein the collected information about the set of resources used by the service comprises metering data that is generated by the service and a set of time stamps identifying each particular use, by the service, of each resource in the set of resources.

7. The computer of claim 5, wherein the service is one of a software component and a hardware component configured to execute in a cluster of two or more computer systems in a cloud computing environment, and wherein collecting the information about the use of the set of resources by the service further comprises the computer executing the program instructions to collect the information about the use of the set of resources by the service in each computer system in the cluster of two or more computer systems in the cloud computing environment, and wherein creating the response to the request using the signed information as proof of the validity of the information includes grouping the signed information about the use of the set of resources by the service.

8. A computer program product for managing metering of a service, the computer program product comprising a computer readable storage device having program instructions embodied therewith, the program instructions executable by a computer to cause the computer to:

identify a private key corresponding to the service;

collect information about use of a set of resources by the service, wherein the computer stores the collected information about the set of resources used by the service in a usage graph, and wherein the computer digitally signs the usage graph storing the collected information about the set of resources used by the service, and wherein the computer generates and verifies a description of the use of the set of resources by the service using the collected information in the digitally signed usage graph;

sign the collected information using the identified private key, to form signed information;

receive a request to verify information regarding a selected portion of a period of time during the use of the set of resources by the service; and create a response to the request using the signed information as proof of validity of the information in response to receiving the request to verify the information regarding the selected portion of the period of time during the use of the set of resources by the service.

9. The computer program product of claim 8, wherein the collected information about the set of resources used by the service comprises metering data that is generated by the service and a set of time stamps identifying each particular use, by the service, of each resource in the set of resources.

10. The computer program product of claim 8, wherein the service is one of a software component and a hardware component configured to execute in a cluster of two or more computer systems in a cloud computing environment, and wherein collecting the information about the use of the set of resources by the service further comprises the computer executing the program instructions to collect the information about the use of the set of resources by the service in each computer system in the cluster of two or more computer systems in the cloud computing environment, and wherein creating the response to the request using the signed information as proof of the validity of the information includes grouping the signed information about the use of the set of resources by the service.

* * * * *